United States Patent
Parsons

[15] 3,666,119
[45] May 30, 1972

[54] AUTOMATIC LOADING AND SIGNALING SYSTEM FOR DRIVER OPERATED VEHICLES

[72] Inventor: Ward H. Parsons, 1202 Green Glen Rd., Birmingham, Ala. 35216

[22] Filed: Sept. 25, 1970

[21] Appl. No.: 75,404

[52] U.S. Cl............................................214/41, 340/246
[51] Int. Cl..........................................................B65g 67/04
[58] Field of Search............................214/41, 42 R; 340/246

[56] References Cited

UNITED STATES PATENTS 3,235,104  2/1966  Morawski et al.....................214/42 R

*Primary Examiner*—Robert G. Sheridan
*Attorney*—Polachek, Saulsbury & Hough

[57] ABSTRACT

A truck loading system for loading an open top truck with material discharged from an overhead bin at a loading station. The bin has a gate operated by electromechanical means. An omnidirectional loading probe is connected in a circuit with the electromechanical means and with a signal lamp visible to the driver for closing the gate and turning on the lamp when the probe is tilted by material in the truck. A second omnidirectional probe is connected in the circuit with a second signal lamp to signal when the second probe is tilted by the truck body after the truck is fully loaded, and to lock the gate closed as the truck is driven away from the loading station. A start switch in the circuit initiates opening the gate. The start switch and probes can be mechanically interconnected so that adjusting the position of the start switch selectively positions the probes in the truck body.

9 Claims, 6 Drawing Figures

INVENTOR.
WARD H. PARSONS

INVENTOR.
WARD H. PARSONS
BY Polachek & Saulsbury
ATTORNEYS

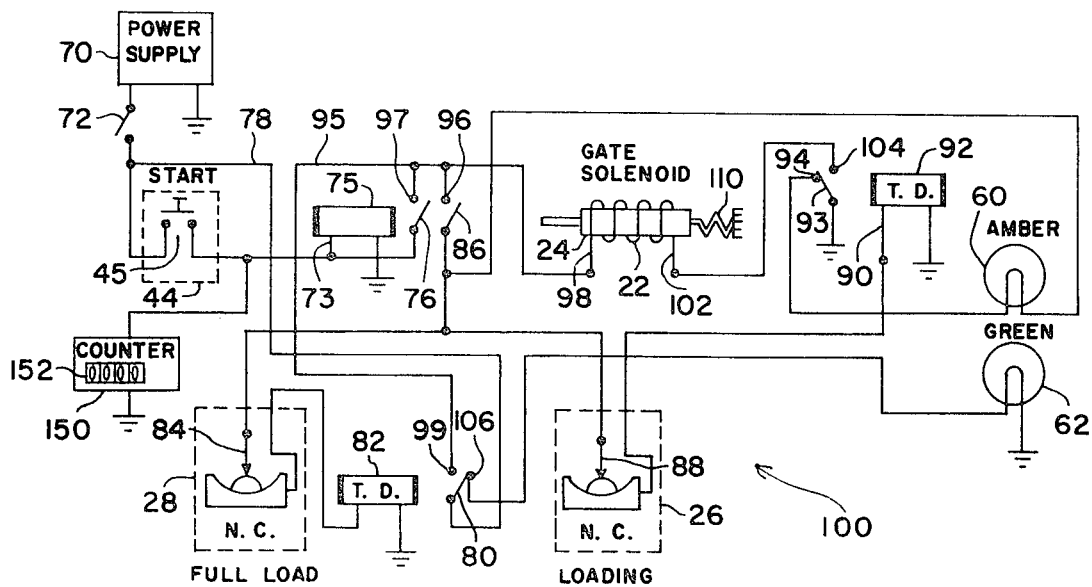

Fig. 5.

| I | TRUCK ADVANCED TO FIRST LOADING POSITION |
|---|---|
| II | HEIGHT OF TILT SWITCH PROBES ADJUSTED |
| III | START BUTTON PRESSED. GATE OPENS LOADING STARTS. LAMPS ARE OUT |
| IV | LOADING CONTINUES UNTIL LOADING SWITCH PROBE TILTS. GATE CLOSES AND AMBER LAMP LIGHTS. |
| V | TRUCK ADVANCED. AMBER LIGHT GOES OUT. LOADING SWITCH PROBE HANGS UPRIGHT. GATE OPENS. |
| VI | LOADING CONTINUES UNTIL LOADING SWITCH PROBE TILTS AGAIN. GATE CLOSES AND AMBER LAMP LIGHTS. |
| VII | V AND VI REPEATED UNTIL TAIL GATE SWITCH PROBE TILTS AND GREEN LIGHT GOES ON. GATE IS HELD CLOSED, AS FULLY LOADED TRUCK IS DRIVEN AWAY. |

Fig. 6.

INVENTOR.
WARD H. PARSONS
BY Polachek & Saulsbury
ATTORNEYS

AUTOMATIC LOADING AND SIGNALING SYSTEM FOR DRIVER OPERATED VEHICLES

This invention concerns an automatic loading system for dump trucks, trailers and other driver operated vehicles which are loaded from an overhead bin or hopper.

Heretofore, it has been conventional to load a truck in either of two ways. In one method, a truck to be loaded is driven under an overhead bin. An operator standing outside the truck opens the gate of the overhead bin by manual or by electrical controls, and the first empty position of the truck is filled. The operator then signals the driver to pull up to the next empty position for loading. This is repeated from two to 10 times or more until the truck is fully loaded at which time the operator signals the driver that loading is completed and he is to drive away. In a second method, the truck is driven under the overhead bin, the driver dismounts from the truck and operates the gate of the overhead bin by manual or electrical controls until the material builds up to the desired level in the first empty position of the truck. The driver then shuts off the flow of material from the bin, climbs back into the truck and drives forwardly to the next empty loading position. Then the driver dismounts again and operates the gate of the bin again until the second position of the truck is filled. These operations are repeated until the truck is fully loaded. The driver must watch the flow of material constantly, otherwise the truck will be overloaded or the loaded material will overflow, or both. The driver or loading operator must attend the loading constantly. The prior loading methods outlined above are objectionable because they either require an extra loading operator, or else they require the driver to climb out and into the truck repeatedly, which is very slow, laborious and tedious. Furthermore, loading is not uniform in any method because loading is done by eye so no two trucks are loaded the same.

The present invention is directed at an automatic loading system wherein the truck driver remains in the truck cab at all times and advances the truck in response to visual signals. A start switch is located under the bin at a position where it can be actuated by the driver of the truck. The gate of the bin is automatically opened electromechanically and the truck body is filled to predetermined level. A tilt switch probe depending from the bin is suspended in the truck body. This probe is deflected when the angle of repose of the load in the truck rises to predetermined level. Deflection or tilt of the probe actuates a control circuit whereby the gate of the bin is automatically closed and a signal lamp lights. This may be an amber light. The driver then drives forwardly until the amber signal light goes out, whereupon the gate of the bin automatically opens and loading continues in the next loading position of the truck. The amber signal light goes out when the tilt switch probe assumes vertical, free suspension position. The sequence of operations is repeated until the truck body is fully loaded from end to end. When the truck is fully loaded, a second tilt switch probe inserted in the truck body is engaged by the tail gate of the truck. The probe is connected in the control circuitry in such a way that when it is tilted the bin gate is kept closed until the start of the next loading cycle. Another signal lamp which may emit a green light is connected in the control circuitry and lights when the loading cycle is completed and the second tilt switch probe is tilted. This green light indicates to the driver that he has a fully loaded truck and should drive away from the loading station. It will be noted that the truck driver remains in the truck cab at all times and advances the truck from one loading position to another loading position, and finally away from the overhead bin, all in response to visible signals which are automatically flashed on and off.

Other and further features, objects and advantages of the invention will become apparent from the following detailed description taken together with the drawings wherein:

FIG. 5 is a simplified diagram of the electrical control circuitry of the system.

FIG. 6 is a summary of operating steps of the system.

Figure 1:
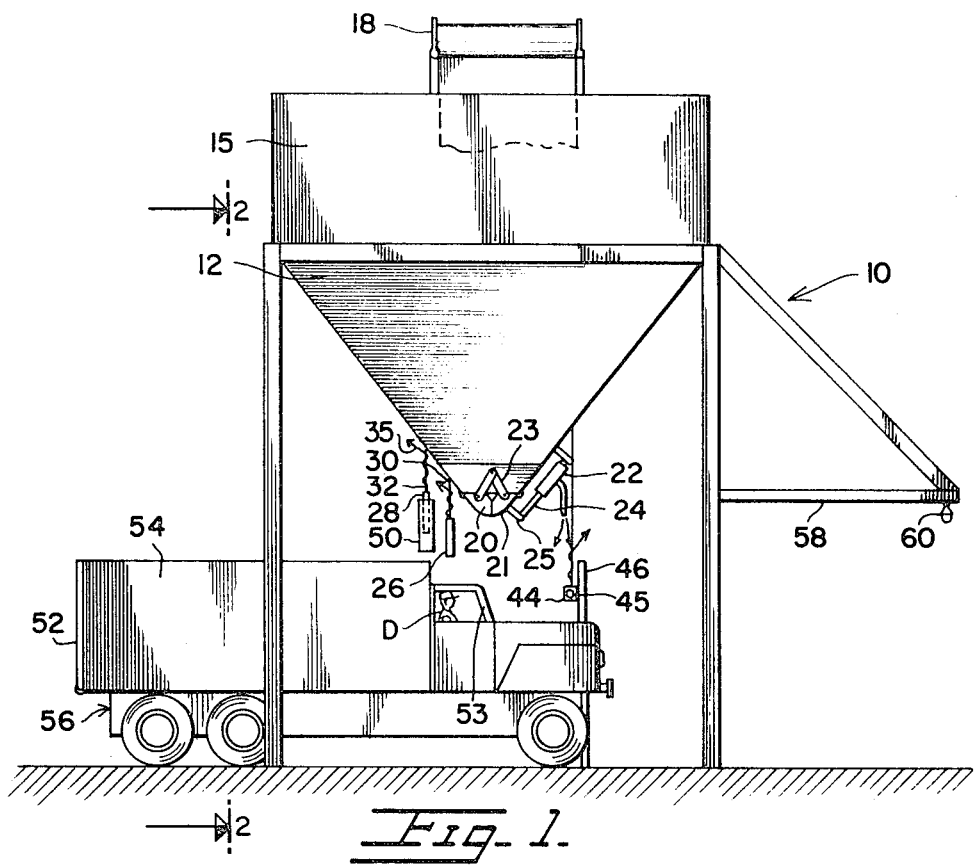
FIG. 1 is a side view, partially diagrammatic in form of essential parts of a truck loading station equipped with a loading and signaling system according to the invention. A truck to be loaded is shown advancing toward the first loading position.
Figure 2:
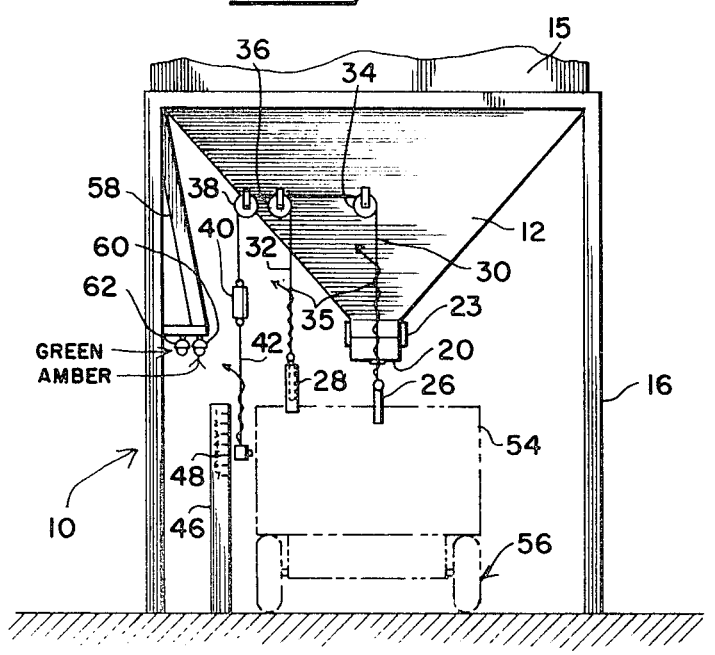
FIG. 2 is a rear view of part of the truck loading station, taken on line 2—2 of FIG. 1.

Referring first to FIGS. 1, 2, 3 and 4, there is shown a truck loading station 10 in which a bin 12 having a tapered open bottom 14 is supported in an elevated position by a framework 16 of beams and rails. The bin has a hopper 15 with an open top. The bin is loaded by a conveyor 18. Any suitable flowing material in lump, granular or powder form can be dispensed from the bottom of the bin which is closed by a pair of doors 20, 21, pivoted together by links 23. The doors can be opened by an electrically operated solenoid 22, whose plunger 24 is pivotally connected to an arm 25 extending outwardly of door 21. The two doors constitute the gate of the bin 12.

Suspended from the bin are two omnidirectional tilt switch probes 26, 28 of the type which contains a normally closed switch that opens when the probe is axially tilted beyond a predetermined vertical angle in any direction in a horizontal range of 360°. A typical tilt switch probe of this omnidirectional type is described in U.S. Pat. No. 3,114,804. Probes 26, 28 are carried by cables 30, 32 entrained on sheaves 34, 36 supported by the bin. The cables support wires 35 connected to the probes. The cables pass over idler sheave 38 and terminate at a counterweight 40. A cord 42 connected to the counterweight supports a start switch assembly 44 carrying pushbutton start switch 45. Assembly 44 is located near a post 46 marked with graduated lines of a vertical scale 48. The start switch assembly can be pulled down or raised up along the scale to raise or lower probes 26, 28. Probe 26 is located forwardly of probe 28. It is centered and is slightly lower than probe 28. Probe 28 is enclosed in a protective body 50 and is disposed rearwardly of probe 26 for contact by the tail gate or rear wall 52 of the body 54 of truck 56. The driver D sits in cab 53 and drives the truck forwardly under bin 12. Brace bars 58 at the front of framework 16 support a pair of lamps 60, 62 which emit differently colored light, amber and green respectively, for example. These lamps are clearly visable to the driver in the truck cab 53 at all times. The start switch 45, lamps, probes and operating solenoid of the loading bin are connected in an electric circuit 100 shown schematically in FIG. 5, to which reference is now made.

In circuit 100, a power supply 70 is connected via an on-off switch 72 to the normally open pushbutton start switch 45 of switch assembly 44. The switch is connected to coil terminal 73 of a relay 75 and to normally open relay contact 76. Relay holding line 78 is connected to contact 80 of time delay relay 82. The coil of relay 82 is connected via normally closed switch 84 of probe 28 to contact 86 of relay 75. Switch 88 of probe 26 is connected between relay contact 86 and coil terminal 90 of time delay relay 92. Relay 92 has normally closed contacts 93, 94 connected via amber lamp 60 to relay contact 86. High voltage line 95 is connected to relay contacts 96, 97, terminal 98 of solenoid 22 and to normally open contact 99 of relay 92. Terminal 102 of the solenoid is connected to relay terminal 104. Contact 106 of relay 92 is connected to green lamp 62.

Operation of the system will now be described, with particular reference to the sequence of steps I–VII set forth in FIG. 6.

The truck 56 advances to the first loading position as indicated in step I of FIG. 6. At this position of the truck, the driver raises or lowers the start switch assembly 44 to set probes 26, 28 at the proper height for the particular height of the truck he is driving. This is step II. Then the driver presses and releases the button of start switch 45. The bin gate opens and lamps 60, 62 are extinguished. This is step III of FIG. 6.

This operation can be understood by referring to FIG. 5. It will be noted that when switch 45 is closed relay 75 is energized. Contacts 76 and 97 close and constitute a holding circuit for relay 75 via relay contacts 80, 99, which close because relay 82 is energized via closed contacts 86, 96 of energized relay 75 and via closed probe switch 84. Relay contacts 80, 106 open so that the green light is out. Relay 92 is energized via closed switch 88 of probe 26 and closed relay contacts 86, 96. The amber light goes out because relay contacts 93, 94 open. The solenoid 22 becomes energized via contacts 93, 104 which close when relay 92 is energized. This operation of the solenoid opens the doors 20, 21 of the bin gate against tension in spring 110. Truck 56 is now in the position of FIG. 3 and the flowing material 125 fills the truck body at the first empty position.

Figure 3:
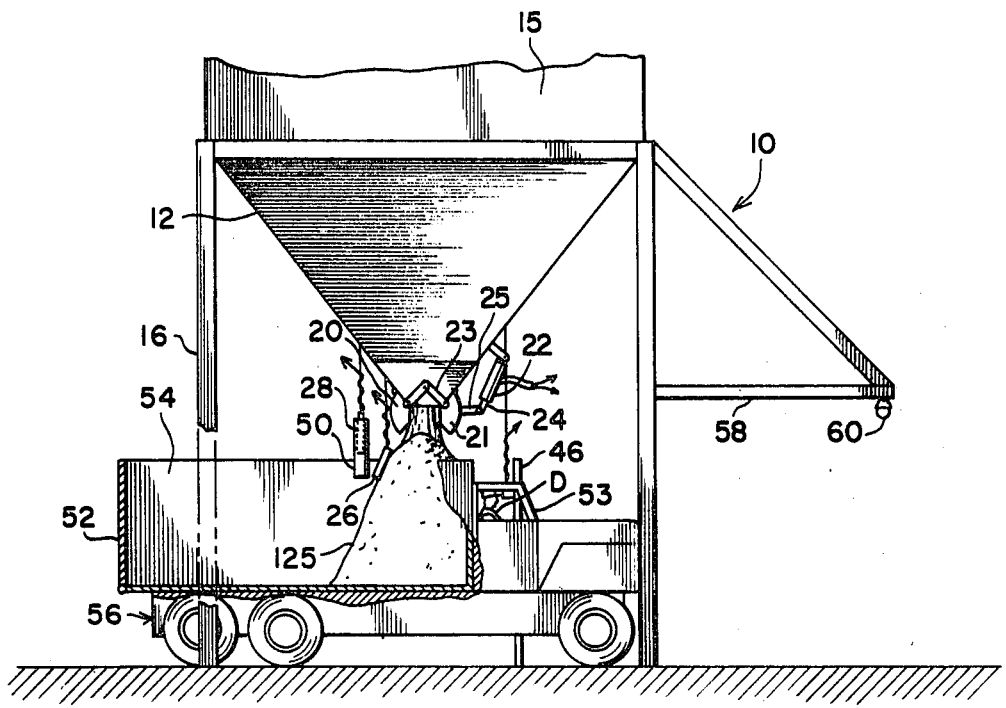
FIG. 3 is a central vertical sectional view of part of the truck loading station and part of the truck, shown positioned at a first loading position, just at the end of filling the first empty position when the gate of the bin is about to close.

Loading continues as stated in step IV of FIG. 6, until the loading switch probe 26 tilts due to the angle of repose of the pile of material 125, as shown in FIG. 3. At this time the bin gate closes and the amber lamp lights. This operation occurs because as seen in FIG. 5, tilting probe 26 opens switch 88 which deenergizes relay 92. Contacts 93, 94 close to light the amber lamp 60 and contacts 93, 104 open to deenergize the solenoid and close doors 20, 21 of the bin gate.

The driver D of the truck drives the truck forwardly until the amber light goes out. At this truck position the gate doors 20, 21 open again to start filling the second empty position of the truck body. When the truck moves forward, the loading probe 26 assumes a vertical position as stated in step V of FIG. 6. Then, as seen in FIG. 5, switch 88 of probe 26 closes, to reenergize relay 92, close contacts 93, 104 and open contacts 93, 94. The amber light goes out when contacts 93, 94 open and the solenoid 22 is energized to open the bin gate when contacts 93, 104 close.

Figure 4:
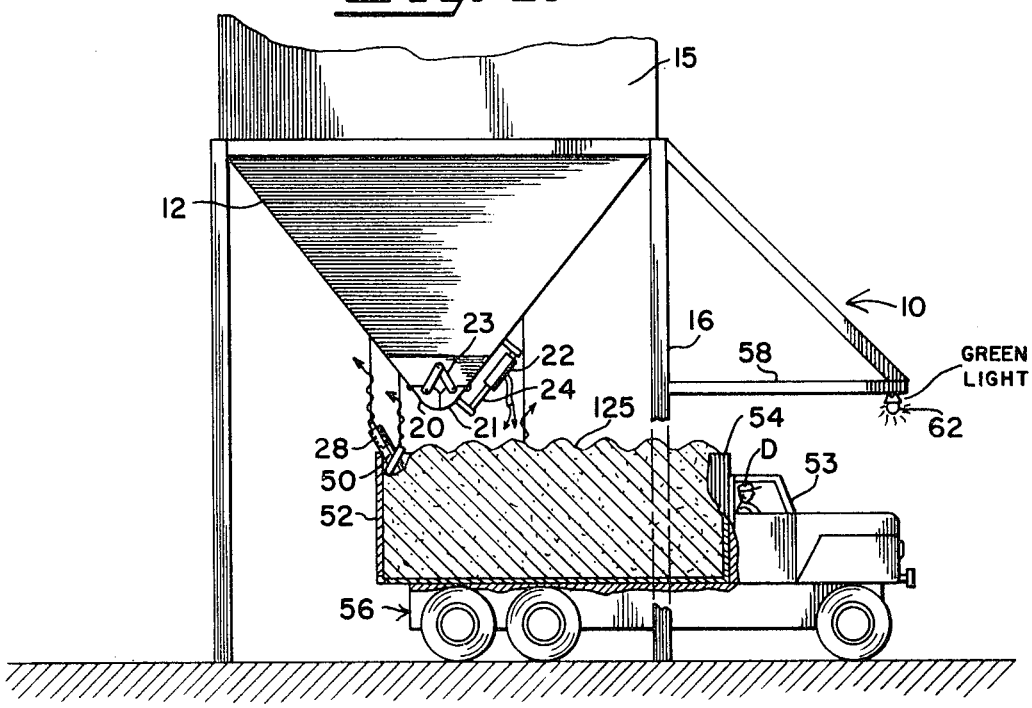
FIG. 4 is another central sectional view similar to FIG. 3 with the truck in the final loading position with truck body completely loaded, and gate of the bin shown closed.

The loading at the second truck position continues until the probe 26 tilts again as stated in step VI, in a manner similar to that shown in FIG. 3, whereupon the gate closes and amber lamp lights as explained above. The driver is signaled to advance the truck to the third filling position and the sequence of steps V and VI is repeated until the truck body is finally fully loaded as stated in step VII of FIG. 6. At this truck position, both amber lamps 60 and green lamp 62 both light. This occurs because tilting the loading probe 26 as shown in FIG. 4 causes the amber light to go on and the bin gate to close, as explained above. Tilting of probe 28 by tail gate as shown in FIG. 4, opens switch 84 of circuit 100. This causes relay 92 to become deenergized. Relay contacts 80, 99 open and contacts 80, 106 close. When contacts 80, 106 close, the green lamp 62 lights. When contacts 80, 99 open they break the holding circuit for relay 75 via closed contacts 76, 97 so relay 75 becomes deenergized. The bin gate is now in a locked position because the solenoid 22 cannot become energized again even if probe 26 assumes an upright position. The power supply for solenoid 22 remains open due to open contacts 86, 96 of relay 75. The truck is driven away when the green lamp lights. Probes 26 and 28 assume vertical position. Relay 82 remains deenergized due to open relay contacts 86, 96.

It is desirable that both relays 82 and 92 be time delay relays which are fully energized and actuated only after a few seconds has elapsed following tilting of probes 26 and 28. This is to prevent premature closure of the bin gate and lighting of lamps 60, 62 in the event that the flowing stream of material 125 instantaneously tilts the probes.

The probes can be of any desired construction, however omnidirectional operation of both probes is essential, because the material 125 may flow irregularly into the truck, and the truck may be so positioned that the tail gate 52 is not perpendicular to the central vertical fore and aft plane of the bin. It is possible to substitute audible signals for the lamps, or to provide audible signals in addition to the lamps. Other colors than amber and green can be used. It is further possible to provide a master switch panel with rotary switches for operating multiple bins. It is also possible to connect a counter 150 to the start switch 45 as shown in FIG. 5, to count the loads by registering one count electrically each time the start switch is closed. The count 152 will be displayed numerically.

Other and further modifications and variations are possible without departing from the invention as defined in the appended claims. The term "truck" as used herein shall be taken to mean any kind of driver operated cart, lorry wagon or the like having a body with open top for loading with material from an overhead bin.

What is claimed is:

1. A truck loading system comprising support; a bin carried by said support in an elevated position at a truck loading station for discharging flowable material into a truck disposed under the bin, said bin having a gate openable and closable to control flow of said material out of the bin and into the truck; electromechanical means arranged to open and close the gate; electrically operated signal means connected in circuit with said electromechanical means to signal when the gate is closed upon filling the truck to a predetermined level at any loading position; a tilt switch loading probe suspended below the bin to sense when the truck is filled to said predetermined level, said probe containing switch means responsive to tilt of said probe at an angle in a vertical plane through a horizontal range of 360°; and circuit means interconnecting the probe signal means and electromagnetic means, so that the gate is closed and the signal means is actuated when the probe is tilted by said material rising to said level in the truck, said truck having a rear wall, and further comprising another tilt switch probe suspended below the bin to contact said wall and sense when the truck has moved in to a final fully loaded position; other signal means connected in circuit with the other probe to signal that the truck is fully loaded; and other circuit means interconnecting said other tilt switch probe, other signal means, and first named circuit means to actuate said other signal means and to lock said gate closed, while the loaded truck is driven away from said loading station.

2. A truck loading system as defined in claim 1, wherein said other probe contains other switch means responsive to tilt of said other probe at any angle in a vertical plane through a horizontal range of 360°.

3. A truck loading system as defined in claim 1, wherein the truck is driven by a driver who remains in the truck cab at all times during loading of the truck, said system further comprising start switch means disposed under the bin and connected in circuit with said first named circuit means and other circuit means for opening the gate and deactivating the first named and other signal means when the truck is located at a first loading position under the bin, said start switch means being located so that it can be operated by the driver of the truck while he is in the truck cab.

4. A truck loading system as defined in claim 3, further comprising suspension means mechanically interconnecting the start switch means, said loading probe and said other probe so that adjusting the position of the start switch means by the driver of the truck selectively adjusts the elevational positions of the probes in the truck.

5. A truck loading system as defined in claim 4, further comprising counting means connected in circuit with the start switch for counting numerically the number of truck loads discharged from said bin into a succession of trucks.

6. A truck loading system as defined in claim 1, wherein the first named and other signal means are lamps respectively emitting light of different colors, said lamps being disposed for viewing by the driver of the truck at all times while he is in the truck cab.

7. A truck loading system as defined in claim 6, wherein the first named circuit means comprises relay means arranged to actuate the electromechanical means for opening the gate and turning off the first named signal means when said loading probe is tilted by material in the truck, said relay means being further arranged to turn on the first signal means while the gate closes as the driver drives the truck forwardly a distance sufficient to disengage the loading probe from material in the truck to allow the loading probe to assume a vertical position.

8. A truck loading system as defined in claim 7, wherein said other circuit means comprises other relay means arranged to actuate said other signal means to signal that the truck is fully loaded when the other probe is tilted by the rear wall of the truck.

9. A truck loading system as defined in claim 8, wherein said other relay means is further arranged to deenergize the first named relay means for locking the gate closed while the truck is driven away from the loading station in response to actuation of said other signal means.

* * * * *